Sept. 24, 1957                K. A. GARDNER                2,807,445
HEAT EXCHANGER WELDED TUBE JOINT
Filed June 16, 1954                                        2 Sheets-Sheet 1

INVENTOR.
KARL A. GARDNER
BY Frease & Bishop
ATTORNEYS

Sept. 24, 1957      K. A. GARDNER      2,807,445
HEAT EXCHANGER WELDED TUBE JOINT
Filed June 16, 1954      2 Sheets-Sheet 2
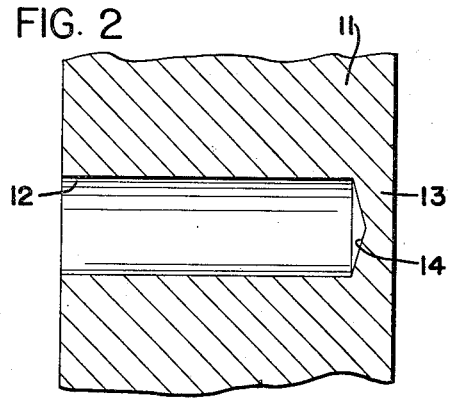
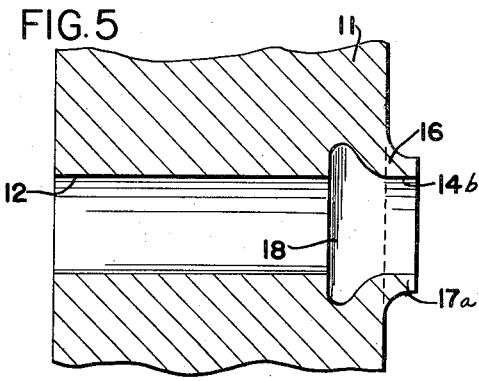
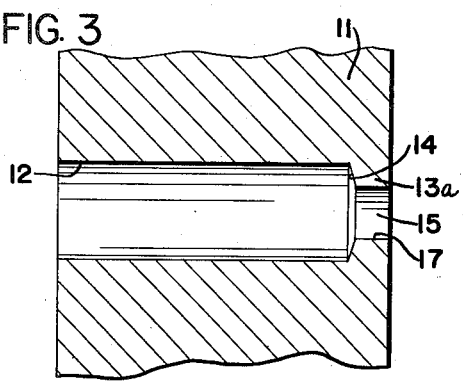
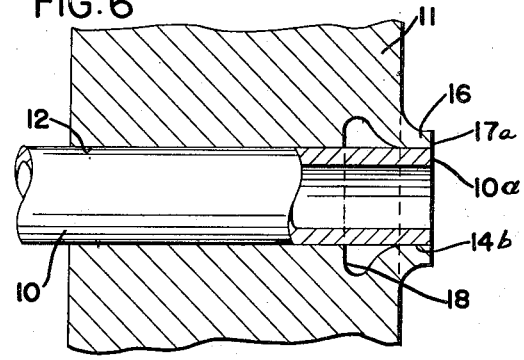
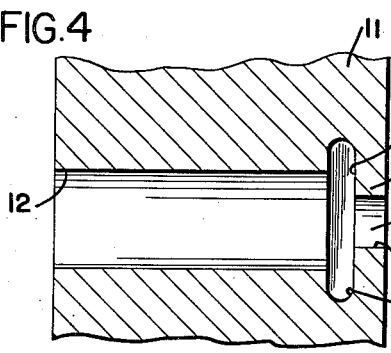
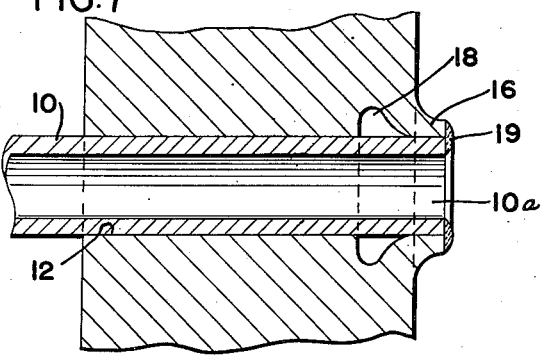
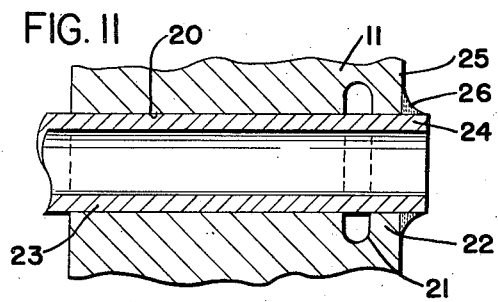
INVENTOR.
KARL A. GARDNER
BY Frease & Bishop
ATTORNEYS United States Patent Office 2,807,445
Patented Sept. 24, 1957

2,807,445

HEAT EXCHANGER WELDED TUBE JOINT

Karl A. Gardner, Canton, Ohio, assignor to The Griscom-Russell Company, Massillon, Ohio, a corporation of Delaware Application June 16, 1954, Serial No. 437,080

5 Claims. (Cl. 257—236)

This invention relates to heat exchangers and in particular it pertains to a joint for a tube sheet and tubes of a heat exchanger.

A tendency toward heat exchangers for greater pressures has created a need for greater strength of materials and construction of the joints between a tube sheet and tubes. A tube sheet is one of the more vital parts of a heat exchanger. It must be constructed to withstand whatever pressures are contemplated. Likewise, the joints in the tube sheet for the connection of heat exchanger tubes must be equally strong to withstand the same pressures in a leakproof manner.

Ordinarily, the end portion of each tube is mounted within a tube-receiving opening within the tube sheet. Sometimes, the contained pressures, and the temperatures or characteristics of the medium flowing through the tubes may require a welded joint between the ends of the tubes and the tube sheet, rather than mere expanding of the tube ends within the tube sheet tube-receiving openings. In forming such welded joints, one practice has been to form a concentric trepan groove in the head face of the tube sheet around each tube opening, leaving an annular tube sheet portion terminating flush with the head side surface of the tube sheet, within which annular portion the end of the tube is telescoped; and a weld is formed between the tube and the annular tube sheet portion.

This annular tube sheet portion formed by the trepan groove has a thickness substantially equal to the tube thickness in order that the annular tube sheet portion and tube wall will equally conduct heat away from the joint as the felded joint isbeing formed in order to assure a sound weld. If the trepan groove is not formed, there is a greater mass of tube sheet metal extending from the weld than the mass of metal in the tube end which conducts heat away from the weld more rapidly than the tube metal and may result in different weld characteristics and an imperfect weld between that portion of the weld intended to be welded to the tube sheet metal.

Certain disadvantages, however, prevail in the foregoing trepan groove construction. Among the disadvantages is the relative inaccessibility of the parts to be welded because of being flush with the tube sheet surface. In addition, the trepan grooves weaken the tube sheet by reducing the effective thickness thereof.

I have discovered that these disadvantages may be overcome by providing an annular or radial groove within each opening near the head side of the tube sheet to which the ends of the tubes are secured, such as by welding. The portion of the wall of the tube sheet remaining between each groove and the head side preferably is turned outwardly to provide a projecting annular surface to which the tube end is welded. The resulting structure provides for a joint between the tubes and the tube sheet wherein the welded portions are readily accessible. Moreover, inasmuch as a trepan groove is obviated, a tube sheet of smaller thickness may be used for a given pressure. One of the reasons for this is that the groove becomes a part of the opening. Finally, by the use of such annular or radial groove, the grooves of adjacent openings may be overlapped to provide communicating means by which detection of the leakage of heat exchange fluids through the joint may be had.

Accordingly, one of the objects of this invention is to provide a joint between a tube sheet and a tube which does not reduce the effective thickness of the tube sheet.

It is another object of this invention to provide a joint between a tube sheet and a tube by which the parts may be readily welded.

Another object of this invention is to provide the portion of the tube sheet to be welded to the tube with approximately the same thickness as the thickness of the tube, so that the heat of fusion during welding is equally shared by the tube and tube sheet portion.

Another object of this invention is to provide an annular groove in the tube sheet around each opening in such manner that the grooves of adjacent openings may overlap so as to provide a series of connecting grooves by which leakage of heat exchange fluids through the joint may be detected.

Finally, it is an object of the present invention to provide a tube sheet joint construction for heat exchange tubes incorporating the foregoing features that is simple and inexpensive to manufacture and repair.

These and other objects and advantages apparent to those skilled in the art from the following description and claims may be attained, the stated results achieved, and the described difficulties overcome, by the discoveries, principles, apparatus, parts, combinations, subcombinations and elements which comprise the present invention, the nature of which is set forth in the following statement, preferred embodiments of which—illustrative of the best mode in which applicant has contemplated applying the principles—are set forth in the following description, and which is particularly and distinctly pointed out and set forth in the appended claims forming part hereof.

In general, the tube sheet joint construction constituting the present invention includes a tube sheet having a plurality of tube openings extending transversely therethrough, a heat exchange tube in each opening, the end of which tube is welded to one side of the sheet, each opening having an annular groove therearound, the groove forming with the adjacent surface of the tube sheet a wall portion which preferably is subsequently turned outwardly to provide an annular flange by which the end of the tube may be welded to the tube sheet. The invention also includes a method for making such tube sheet joint including the steps of drilling at least one opening transversely of and partially through the tube sheet, the opening having a diameter slightly greater than that of a tube to be inserted therein, drilling a smaller opening through the remaining portion of the tube sheet, the centers of both openings being aligned, providing an annular groove in the wall of the larger opening adjacent the smaller opening, turning the portion of the tube sheet wall through which the smaller opening extends outwardly of the adjacent surface of the tube sheet to provide a protruding annular flange having an inner diameter equal to that of the larger opening, inserting the end portion of a tube within the aperture so that the end of the tube is aligned with the outer end of the flange, and welding the ends of the flange and tube together.

Referring now to the accompanying drawings which are illustrative of the preferred embodiment of the invention, and in which like numerals designate similar parts throughout the several views;

Fig. 2 is a sectional view illustrating the first stage in the new method for producing the novel construction;

Fig. 3 is a sectional view illustrating the second stage in the practice of the new method;

Fig. 4 is a sectional view of the third stage in the practice of the new method;

Fig. 5 is a sectional view of the fourth stage in the practice of the new method;

Fig. 6 is a sectional view of the fifth stage in the practice of the new method;

Fig. 7 is a sectional view of the final stage in the practice of the new method;

Fig. 11 is a sectional view of another embodiment of the improved construction.

Figure 1:
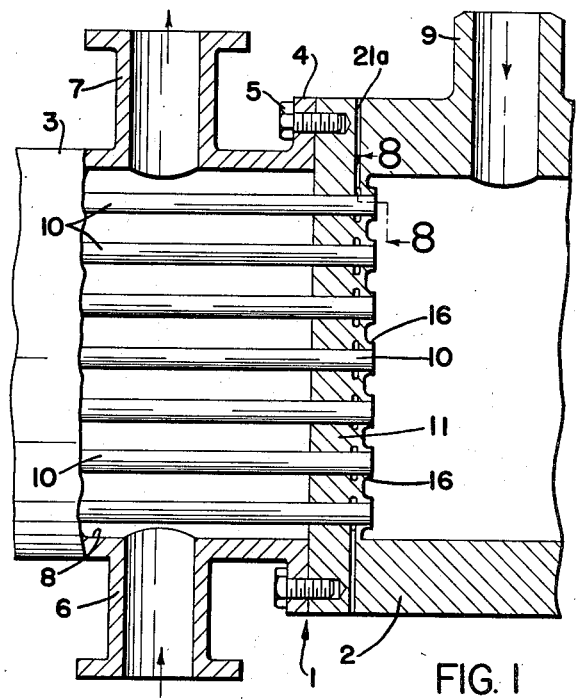
Fig. 1 is a fragmentary, sectional view of a portion of a heat exchanger showing a tube sheet between the head member and the shell.

The improved construction of the present invention is equally applicable to various types of heat exchangers and is shown and described herein for a heat exchanger generally indicated at 1 in Fig. 1. The heat exchanger 1 comprises a head barrel member 2 and a cylindrical shell 3, the latter of which is provided with an end flange 4 by which the shell and head member 2 are connected together by means of bolts 5. Moreover, the shell 3 has a fluid inlet 6 and a fluid outlet 7 which communicate with a heat exchange chamber 8 formed by the shell. The head member 2 is provided with a fluid inlet 9.

Extending through the chamber 8 are a plurality of heat exchange tubes 10 forming a tube bundle, the ends of which communicate with the interior of the head member 2 which is separated from the chamber 8 of the shell 3 by a tube sheet 11 which may be an integral part of the head member as shown in Fig. 1. It is understood that the opposite ends of the tubes 10 may communicate with a similar head member secured to the opposite end of the shell 3 and separated therefrom by a tube sheet in a manner similar to that shown in Fig. 1. However, the present invention is also applicable to a heat exchanger with U-tubes having both ends secured in the same tube sheet.

The manner in which the ends of the respective tubes 10 are secured to the tube sheet 11 in a fluid-tight connection is set forth progressively in Figs. 2 through 7. In Fig. 2 the tube sheet 11 is provided with a plurality of openings 12 having a diameter substantially equal to the external diameter of the tubes 10. Each tube opening 12 extends partially through the tube sheet 11, leaving a tube sheet wall portion 13, and forming end surface 14.

In the next stage, as shown in Fig. 3, the tube sheet wall portion 13 is drilled through at 15 to provide a second opening having a cylindrical surface 17 of smaller diameter than that of the opening 12 and bounded by an annular flange portion 13a comprising the remaining portion of tube sheet wall portion 13. The axes of openings 12 and 15 are aligned and both openings may be drilled in one operation, if desired, by using a proper cutting tool; or may be drilled with separate operations, the opening 12 forming an aligning guide or pilot for drilling the opening 15.

A radial annular groove 18 (Fig. 4) is then cut in the tube sheet 11 preferably as the next operation, at the end of opening 12 adjacent the end surface 14 and tube sheet wall portion 13a. This operation may be performed by an expanding groove cutting tool inserted in the opening 12. After groove 18 has been formed, flange portion 13a has a new shape, as indicated at 13b in Fig. 4, with an inner face 14a parallel with the surfaces of tube sheet 11.

In the next operation, the annular flange 13b of Fig. 4 is drawn outwardly, as shown at 16 in Fig. 5. This operation may be performed by pushing or drawing a punch or plunger or other similar means through the opening 12 from the left, viewing Fig. 5, to form the outturned flange 18 to the shape shown. In carrying out this draw-through operation, the surface 14a (Fig. 4) is reformed, as indicated at 14b in Fig. 5, and the opening surface 17 of the opening 15 is relocated substantially as indicated at 17a in Fig. 5. In any particular installation, the height and thickness of the out-turned annular flange 16 can be calculated as related to the thickness of the tubes telescoped within and welded thereto and the desired distance that the flange 16 projects from the head side of the tube sheet 11 to facilitate the proper formation of the weld.

Having once determined the desired height and thickness of the out-turned flange 16, the diameter and depth of the smaller hole 15 may be calculated so as to provide the correct amount of metal in the flange 13b of Fig. 4 from which the flange 16 is formed. Thus, the diameter and depth of the smaller hole 15 is so regulated as to produce, upon drawing, an annular flange 16 of the desired height and thickness.

In the next operation, as shown in Fig. 6, one of the tubes 10 is inserted into the opening 12 until the end face 10a thereof is in alignment with the surface 17a of the flange 16, the surface 14b being in abutment with the end portion of the tube 10.

The final stage (Fig. 7) constitutes a step of securing the end 10a of the tube 10 at 19 to the end surface 17a of the flange 16 in a fluid-tight manner, preferably by welding or brazing.

By following the foregoing stages the new tube sheet joint construction of the present invention may be obtained whereby a tube sheet of lesser thickness may be used. Also, the welding operation at 19 for each tube joint is facilitated because the parts being welded protrude from the surface of the tube sheet whereby they are more easily accessible.

The foregoing procedure may be altered as in Fig. 11, to achieve a tube sheet joint modified from that shown in Fig. 7. In Fig. 11 the tube sheet 11 may be provided with a plurality of openings 20 extending entirely through the tube sheet. A radial annular groove 21 is then cut into the tube sheet 11 near one end of the opening 20 preferably the head side end, forming a tube sheet wall portion 22. Thereafter a tube 23 is inserted into opening 20 so that a tube portion 24 extends beyond the head side surface 25 of the tube sheet 11. Finally, the tube 23 and the tube sheet are secured together at 26 in a fluid-tight manner, preferably by a fillet weld.

Hence, the tubes may be secured in the tube sheet 11 in one of two ways as shown in Figs. 7 and 11. Both include similar annular grooves 18 and 21 as well as tube sheet wall portions 16 and 22. The grooves and the portions are provided so that a sound weld may be formed with tube and tube sheet portions joined by the weld having substantially the same thickness. Thus heat during welding is conveyed from the weld equally by the tube and tube sheet portions so that the bond between weld and tube and tube sheet portions is sound and uniform.

In other words, the groove 18 in Fig. 7 and the groove 21 in Fig. 11 isolate a thin annular portion of the tube sheet from the main body of the tube sheet to localize welding heat at the desired area and obtain complete fusion and thereby the improved construction includes the advantages of the earlier trepan groove arrangement, while avoiding the disadvantages thereof.

Moreover, the tube joint construction may be employed to advantage for antoher purpose. If the tubes 10 are properly spaced and if the grooves 18 are of sufficient diameter, the grooves 18 may overlap at 20a in a manner shown in Figs. 8 and 9. The advantage of such construction is the use of the overlapping or communicating grooves 18 as leak detection passages for heat exchange fluids which may penetrate between the adjacent walls of the tubes 10 and the tube sheet 11, either from the chamber 8 or the head member 2.

Figure 9:
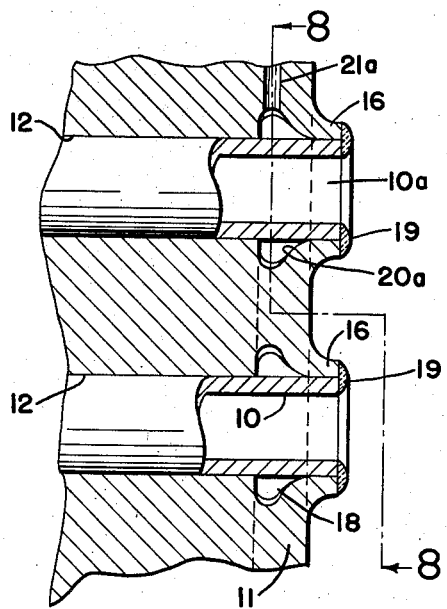
Fig. 9 is a sectional view taken on the line 9—9 of Fig. 8.
Figure 8:
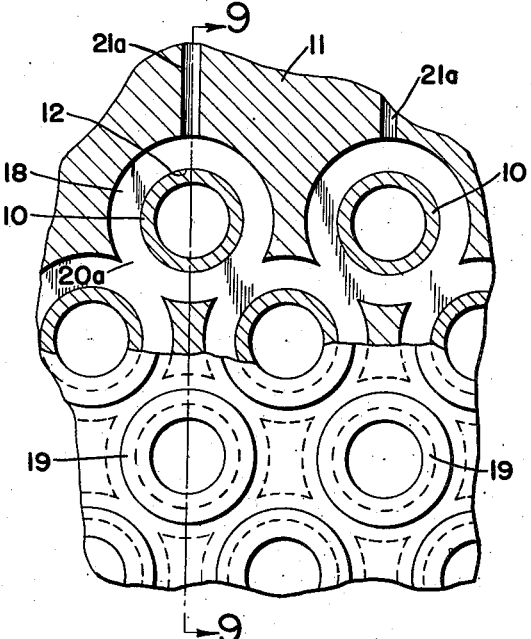
Fig. 8 is an enlarged, fragmentary, sectional view taken on the line 8—8 of Figs. 1 and 9.

Further, the interconnecting grooves 18 may communicate with the external surface of the head member 2 (Fig. 1) by means of a plurality of bores 21a (Figs. 8 and 9). Accordingly, all of the joints in the tube sheet 11 may be interconnected by the overlapping grooves 18 for leak detection purposes, or any preferred portion of tube joints may be interconnected for the same purpose. Various types of leak detection means may be used, such as circulating helium or other fluids through the interconnecting grooves 18 and the bores 21a.

Figure 10:
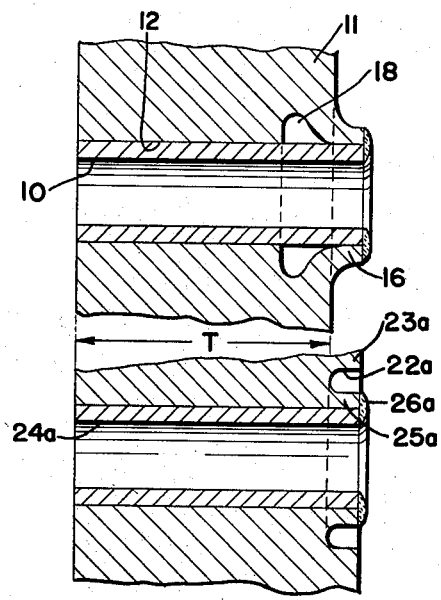
Fig. 10 is an enlarged, fragmentary, sectional view showing the joint between a tube sheet and a tube proposed by the present invention and showing the joint of the prior construction, both of which are shown together for the purpose of comparing their respective tube sheet thicknesses.

By using the foregoing tube joint construction having the radial groove 18 formed in the tube sheet 11 from the hole 12 as shown in Figs. 4 and 5, an advantage is obtained over the former construction as shown in Fig. 10. In the former construction a trepan groove 22a was provided in the surface of tube sheet 23a, which groove was concentrically disposed around the end of a tube 24a where it was welded to an annular flange 25a formed by the trepan groove 22a and the bore for the tube 24a. The flange 25a and the tube 24a were welded together at 26a. The trepan groove 22a is undesirable for the reason that it reduces the effective thickness of the tube sheet 23a. By providing the annular groove 18 as part of the opening 12, a tube sheet having a thickness "T" may be used having the same effective thickness as the tube sheet 23a with which it is compared in Fig. 10. In a similar manner the embodiment shown in Fig. 11 may be compared.

Accordingly, the instant tube sheet joint is an improvement over such a joint having a trepan groove in the surface of the tube sheet. By obviating the surface trepan groove a tube sheet of less thickness and weight may be used. In addition, greater access for welding the tube end to the tube sheet is afforded. Also an isolated tube sheet welding flange is provided without decreasing the effective thickness of the tube sheet; and the improved construction can be used with either a fillet or fusion weld. Finally, by properly spacing the tubes 10 the grooves 18 may overlap and thereby provide interconnecting passages for detection of leakage of heat exchange fluids through the joint.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown.

Having now described the features, constructions and principles of invention, the characteristics of the new welded tube joint for heat exchangers, and the advantageous, new and useful results provided; the new and useful discoveries, principles, parts, elements, combinations, subcombinations, structures and arrangements, and mechanical equivalents obvious to those skilled in the art, are set forth in the appended claims.

I claim:

1. In a heat exchanger, a tube sheet having head and shell sides, there being a plurality of tube openings formed in the tube sheet extending between the head and shell sides thereof, the wall of each tube opening being provided with an annular groove adjacent said head side, an annular flange portion formed integrally of the tube sheet defining that portion of the opening extending between the groove and the head side end of the opening, the diameter of that portion of the opening defined by the flange being the same as that of the remaining portion of the opening extending between the groove and the shell side end of the opening, a tube having a portion of uniform diameter and wall thickness telescoped within each opening terminating in an end face located in a plane spaced outwardly of said head side of the tube sheet, and an end portion of said tube being welded to the flange portion of the tube sheet.

2. The construction defined in claim 1 in which the annular flange portion to which the end portion of the tube is welded projects outward of the head side of the tube sheet, and in which the end portion of the tube is welded to the projecting flange portion.

3. The construction defined in claim 1 in which each groove communicates with at least one corresponding groove of an adjacent opening.

4. The construction defined in claim 1 in which the grooves of adjacent openings are interconnected within the tube sheet, and in which means is provided communicating between the interconnected grooves and the exterior of the tube sheet.

5. The construction defined in claim 1 in which the annular flange portion projects from the tube sheet radially with respect to the tube, and in which the end portion of the tube having an end face located in a plane spaced outwardly of the head side of the tube sheet is welded to said flange.

References Cited in the file of this patent

UNITED STATES PATENTS

| | | |
|---|---|---|
| 1,530,266 | Huston | Mar. 17, 1925 |
| 1,987,891 | Cattanach | Jan. 15, 1935 |
| 2,252,069 | Fletcher | Aug. 12, 1941 |

FOREIGN PATENTS

| | | |
|---|---|---|
| 406,622 | Germany | Nov. 29, 1924 |
| 424,752 | Italy | Sept. 2, 1947 |